Feb. 13, 1934.                G. W. GARMAN                1,947,197
                              REGULATING SYSTEM
                            Filed April 17, 1931
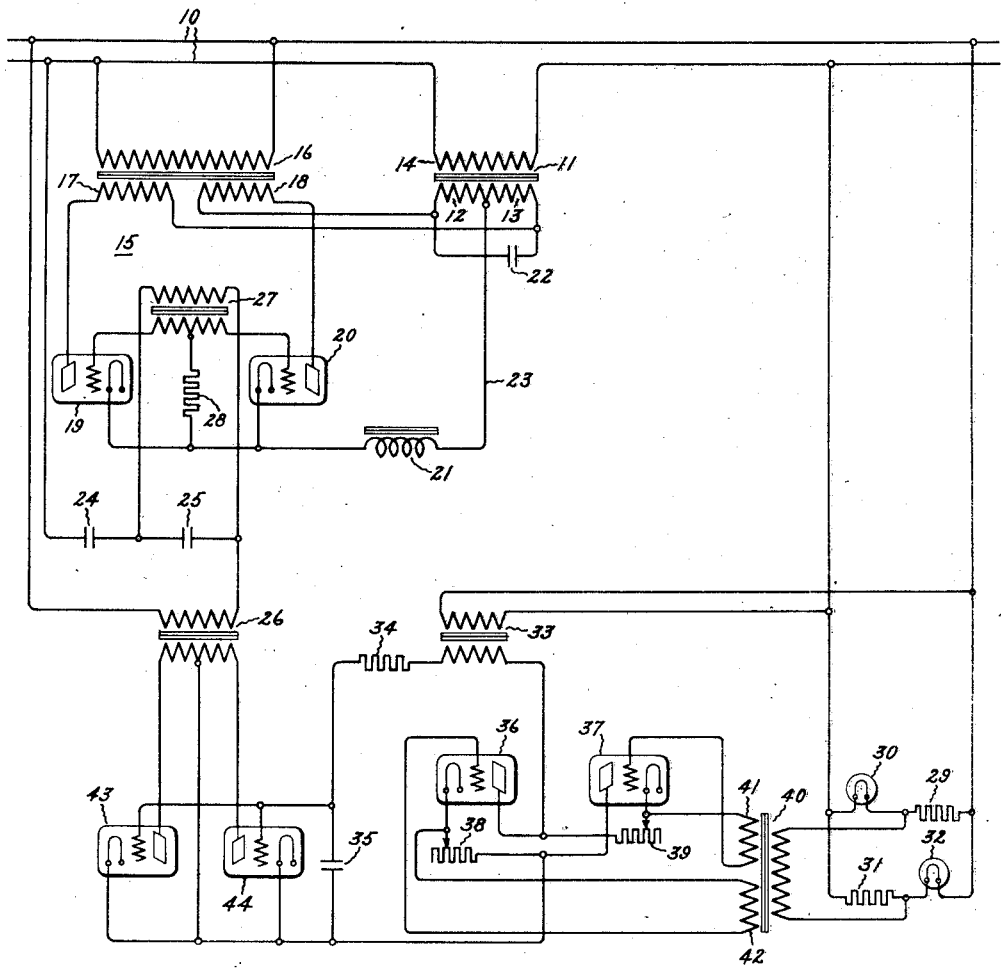
Inventor:
George W. Garman,
by Charles E. Mullen
His Attorney.

Patented Feb. 13, 1934

1,947,197

UNITED STATES PATENT OFFICE 1,947,197

REGULATING SYSTEM

George W. Garman, Scotia, N. Y., assignor to General Electric Company, a corporation of New York Application April 17, 1931. Serial No. 530,881

9 Claims. (Cl. 171—119)

My invention relates to apparatus for regulating an electrical condition of an alternating current circuit and more particularly to electrical regulating apparatus utilizing electric valves which is particularly suitable for regulating the voltage of an alternating current feeder circuit.

Heretofore numerous arrangements have been devised for regulating the voltage or other electrical condition of an alternating current circuit. Certain of these arrangements involve the use of moving contacts and other moving parts which tend to be unreliable in operation and are subject to wear and other deterioration in use. Certain other regulating apparatus have been devised utilizing electric valves for effecting the desired regulation and it is an object of my invention to provide an improved regulating circuit of this latter type.

It is a further object of my invention to provide an improved regulating apparatus utilizing electric valves which have a sufficiently large capacity to carry the regulating power currents.

It is a still further object of my invention to provide an improved electric regulating apparatus utilizing electric valves in which there is no appreciable time lag and which is capable of effecting any desired fineness of regulation.

In accordance with my invention I provide an alternating current circuit with a booster transformer and energize the primary winding of this transformer from the circuit through a pair of electric valves. A voltage responsive resistance bridge controls the phase relation of the grid potentials of the electric valves with respect to the anode potentials and thus controls the output of the valves. The operation of the electric valve arrangement is analogous to that of a controlled rectifier, each valve supplying unidirectional current in opposite directions to opposite halves of the primary winding of the booster transformer.

For a better understanding of my invention together with other and further objects thereof, reference is had to the following description taken in connection with the accompanying drawing and its scope will be pointed out in the appended claims. The single figure of the accompanying diagrammatic drawing illustrates one embodiment of my invention for regulating the voltage of an alternating current feeder circuit.

Referring to the drawing, I have illustrated an apparatus for maintaining constant the potential of the alternating current circuit 10 comprising a booster transformer 11 and a controlled rectifying apparatus 15. The booster transformer 11 is provided with a pair of primary windings 12 and 13, and a secondary winding 14 connected in series with the alternating current circuit 10. A controlled rectifier 15 is energized from the circuit 10 by means of a transformer 16 provided with a primary winding connected to the circuit 10 and a pair of secondary windings 17 and 18. The primary winding 12 of the transformer 11 is adapted to be energized from the secondary winding 18 of the transformer 16 through an electric valve 20, while the primary winding 13 is similarly energized from the winding 17 through an electric valve 19. While these two circuits are shown as having a common connection 23 from the cathodes of the valves 19 and 20 to the junction between the windings 12 and 13, it will be apparent that two separate circuits may be utilized if desired. The electric valves 19 and 20 are each provided with an anode, a cathode and a control grid, and may be of any of the several types well known in the art, although I prefer to use valves of the vapor electric discharge type in which the starting of current in the valve is controlled by the potential on the control grid, but in which the current may be interrupted only by reducing the anode potential below its critical value. There is included in the common connection 23 a reactor 21 for maintaining the total current of the two circuits substantially constant, while a capacitor 22 is connected across the outer terminals of the windings 12 and 13 in order to improve the wave form of the potential supplied to the circuit 10 through the transformer 11 and to provide a closed circuit for the secondary windings 12 and 13 when neither of the valves 19 or 20 is conducting. In order to control the output of the electric valves 19 and 20 I have provided a grid circuit for these valves energized from a static phase shifting circuit, although it will be obvious to those skilled in the art that any other form of phase shifting circuit well known in the art may be provided for producing a grid potential variable in phase with respect to the potential of the circuit 10. The static phase shifting circuit comprises capacitors 24 and 25 and an impedance device 26 serially connected across the circuit 10, while the grid circuits for the valves 19 and 20 comprise opposite halves of the secondary winding of a grid transformer 27 and a current limiting resistor 28. The primary winding of the grid transformer 27 is connected across one of the impedance elements of the static phase shifting circuits, preferably the capacitor 25 as shown. The phase of the potential applied to the grids of the valves 19 and 20 is controlled by varying the impedance of the device 26. This device 26 may comprise a series transformer, the secondary winding of which is short-circuited through a pair of electric valves 43 and 44, which thus gives the device 26 a resistance characteristic. The connection of the secondary winding of the device 26 and the valves 43 and 44 is that of a controlled rectifier with the direct current circuit short-circuited, which is a well known expedient for obtaining a variable impedance. The valves 43 and 44 are each provided with an anode, a cathode and a control grid and are preferably of the high vacuum pure electron discharge type. In order to control the conductivity of the valves 43 and 44 I have provided a voltage responsive resistance bridge, the two pairs of opposite arms of which have dissimilar current-resistance characteristics. As illustrated, this bridge comprises two parallel circuits connected across the circuit 10 consisting of a resistor 29 and a ballast lamp 30 and a resistor 31 and ballast lamp 32, respectively. The resistors 29 and 31 preferably have a temperature resistance characteristic of substantially zero while the ballast lamps 30 and 32, examples of which are well known in the art, preferably have a very high temperature resistance characteristic.

The constants of this bridge circuit are such that the mid-point of the two parallel circuits are at substantially the same potential when the potential of the circuit 10 is normal. With a drop of potential of the circuit 10, the bridge will be unbalanced in one direction while for an increase in the potential of the circuit 10 the bridge will be unbalanced in an opposite direction. A circuit is provided for controlling the conductivity of the valves 43 and 44 comprising a secondary winding of a transformer 33, the primary winding of which is energized from the circuit 10, a resistor 34, a capacitor 35 and electric valves 36 and 37 connected in parallel and in opposition in this circuit. In certain cases it may be found desirable to include variable resistors 38 and 39 in a circuit with the valves 36 and 37, respectively, to secure the desired relation between the currents of opposite direction flowing in this circuit. The valves 36 and 37 are each provided with an anode, a cathode and a control grid, and are also preferably of the vapor electric discharge type. The grids of the valves 36 and 37 are energized from the secondary windings 41 and 42 respectively of a transformer 40, the primary winding of which is connected to the opposite diagonal of the resistance bridge from that to which the circuit 10 is connected. The grids of the electric valves 43 and 44 are energized by a potential derived from this last described circuit, preferably that across the capacitor 35. However, the last described voltage control circuit forms no part of my invention, but is disclosed and broadly claimed in a copending application of Alan S. FitzGerald, filed April 17, 1931, Serial No. 530,895, and assigned to the same assignee as the present application.

In explaining the operation of the above described apparatus, it will be assumed that the potential of the circuit 10 is initially normal and that the phase of the grid potential of electric valves 19 and 20 is such that each of these valves are conducting during substantially a half of their respective half cycles of the alternating current delivered by the transformer 16. These rectified currents flowing in the valves 19 and 20 are delivered to the primary windings 13 and 12 respectively of the transformer 11. Since the current delivered by the valves 19 and 20 in supplying a resistance load would have a wave form consisting of a series of mutilated half sine waves which would produce harmonics and other disturbances if supplied directly to the primary winding of the transformer 11, an inductance 21 is included in the common connection of these two circuits and serves to maintain the total current substantially constant so that the current in the two valves is substantially rectangular in wave form. It has also been found that the addition of the capacitor 22 which is tuned with the transformer 11 to have a natural frequency of oscillation substantially equal to the frequency of the circuit 10, will tend to eliminate the harmonics from the rectangular wave form supplied by the valve circuits and produce a substantially sine wave form in the secondary winding of the transformer 11.

In case the potential of the circuit 10 should drop, due to an increase of load on the feeder or for any other reason, the resistance bridge becomes unbalanced and a current flows through the primary winding of the transformer 40 in such a direction as to impress an alternating grid potential on the electric valve 37 in phase with its anode potential, to render the valve conductive. The connections of the secondary windings 41 and 42 of the transformer 40 are such that only one of the valves 36 and 37 is conductive at any given instant for any given unbalance of the resistance bridge. The unidirectional current flowing in the circuit including the capacitor 35 and the valve 37 will decrease the negative potential of the upper terminal of the capacitor 35 which is always charged to such a polarity that this terminal is negative. With a less negative potential impressed upon the grids of the electric valves 43 and 44, which have negative grid potential characteristics, the conductivity of these valves is increased with the result that the impedance of the device 26 is correspondingly decreased. A decrease in the impedance of the device 26, which it will be remembered, has a resistance characteristic, will shift the phase angle of the potential across the capacitor 25 with respect to the potential of the circuit 10 so that the current through the valves 19 and 20 will be initiated at an earlier point of their respective half cycles, as will be well understood by those skilled in the art. The current supplied to the windings 12 and 13 is thus increased and the voltage of the secondary winding 14 is correspondingly increased to compensate for the voltage drop of the circuit 10 and thus maintain a constant feeder potential. It will, of course, be apparent that with an increase of potential of the circuit 10 the reverse operation takes place; that is, the valve 36 is rendered conducting, the capacitor 35 is charged to a more negative potential, the conductivity of the valves 43 and 44 is decreased, the phase of the grid potentials of the valves 19 and 20 is retarded, and the current flowing in the primary winding of the transformer 11 is decreased to decrease the boosting potential of the secondary winding 14. However, I do not claim broadly as my invention the feature of controlling the excitation of a boosting transformer by means of an electric valve in response to the potential of the circuit for this feature is disclosed and broadly claimed in a copending application of A. Boyajian, filed April 17, 1931, Serial No. 530,880, and assigned to the same assignee as the present application.

While I have described what at present I consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. The combination of an alternating current circuit, a booster transformer connected to said circuit, a pair of primary windings for said transformer, means for alternately energizing said windings including a pair of electric valves, and means responsive to an electrical condition of said circuit for controlling the conductivity of said valves.

2. The combination of an alternating current circuit, a booster transformer connected to said circuit, a pair of primary windings for said transformer, means for energizing said windings comprising a second pair of windings energized from said circuit and a pair of electric valves, each of said second windings being connected to one of said primary windings through one of said valves, and means responsive to an electrical condition of said circuit for controlling the conductivity of said valves.

3. The combination of an alternating current circuit, a booster transformer connected to said circuit, a pair of primary windings for said transformer, means for energizing said windings comprising a pair of electric valves, a transformer having a primary winding connected to said circuit and a pair of second secondary windings, each of said secondary windings being connected to a primary winding of said booster transformer through one of said electric valves, and means responsive to an electrical condition of said circuit for controlling the conductivity of said valves.

4. The combination of an alternating current circuit, a booster transformer connected to said circuit, said transformer having a primary winding provided with an electrical midpoint, a capacitor connected across said winding, a second transformer connected to said circuit and provided with a pair of secondary windings, a pair of electric valves each provided with an anode and cathode, connections from opposite terminals of said secondary windings to the anodes of said valves, and from the other terminals to the outer terminals of the primary winding of said booster transformer, a connection including an inductance from the midpoint of said primary winding to the cathodes of said valves, and means responsive to an electrical condition of said circuit for controlling the conductivity of said valves.

5. The combination of an alternating current circuit, a booster transformer connected to said circuit, means including an electric valve for controlling an electrical condition of said transformer, said valve having an alternating anode potential, and means responsive to an electrical condition of said circuit for maintaining said valve nonconducting for a predetermined portion of each half cycle of positive anode potential.

6. The combination of an alternating current circuit, a booster transformer connected to said circuit, a primary circuit for said transformer including an electric valve having an alternating anode potential, and means responsive to an electrical condition of said circuit for determining the portion of each half cycle of positive anode potential during which said valve is conducting.

7. The combination of an alternating current circuit, a booster transformer connected to said circuit, a primary circuit for said transformer including an electric valve provided with an anode, a cathode, and a control grid, means for applying a potential to said grid variable in phase with respect to the anode potential of said valve to control the conductivity thereof, and means for varying the phase of said potentials in accordance with an electrical condition of said circuit.

8. The combination of an alternating current circuit, a booster transformer connected to said circuit, means including an electric valve provided with a control grid for controlling an electrical condition of said transformer, a static phase shifting circuit, including an impedance element for exciting said control grid, and means for controlling the impedance of said element in accordance with an electrical condition of said circuit.

9. The combination of an alternating current supply circuit, a booster transformer connected to said circuit, means including an electric valve provided with a control grid for controlling an electrical condition of said transformer, means for impressing upon said control grid a potential variable in phase with respect to the potential of said circuit comprising a static phase shifting circuit energized from said supply circuit including an impedance element, a resistance bridge responsive to an electrical condition of said supply circuit, means responsive to the unbalance of said bridge for producing a unidirectional potential of a polarity dependent upon the direction of said bridge, and electric valve means the conductivity of which is controlled by said unidirectional potential for controlling the impedance of said impedance element.

GEORGE W. GARMAN.